Figure 2:
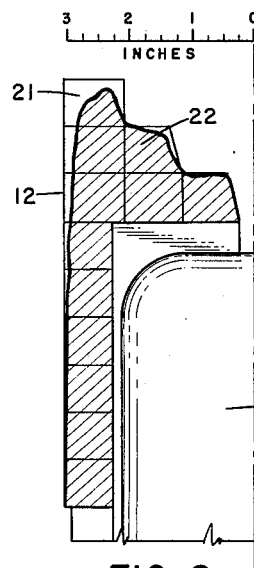

Oct. 23, 1962  G. E. CANNON ET AL  3,059,708
ABRASION RESISTANT STEPPED BLADE ROTARY DRILL BIT
Filed Aug. 7, 1959  4 Sheets-Sheet 1

INVENTORS.
GEORGE E. CANNON,
CHARLES R. OVERLY,
BY THOMAS PENNINGTON, II,
JAMES E. ROOT, III,

ATTORNEY

Oct. 23, 1962   G. E. CANNON ET AL   3,059,708
ABRASION RESISTANT STEPPED BLADE ROTARY DRILL BIT
Filed Aug. 7, 1959   4 Sheets-Sheet 2
FIG. 7.   FIG. 8.   FIG. 9.
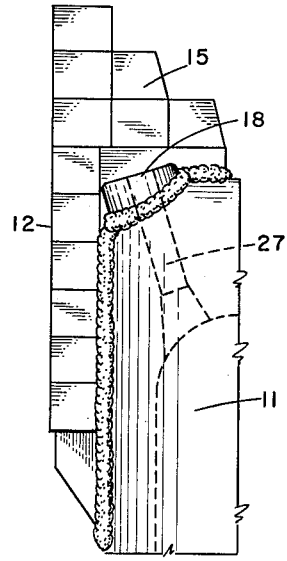 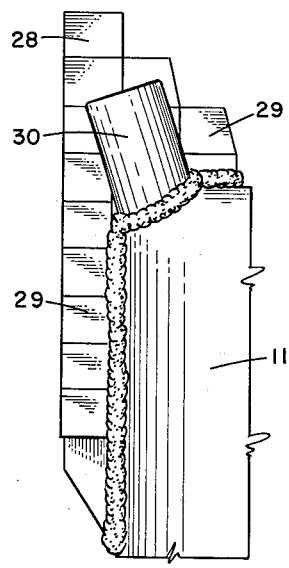 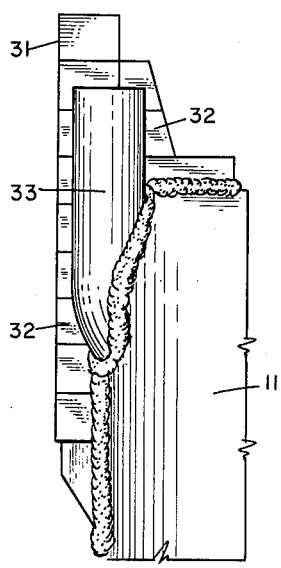
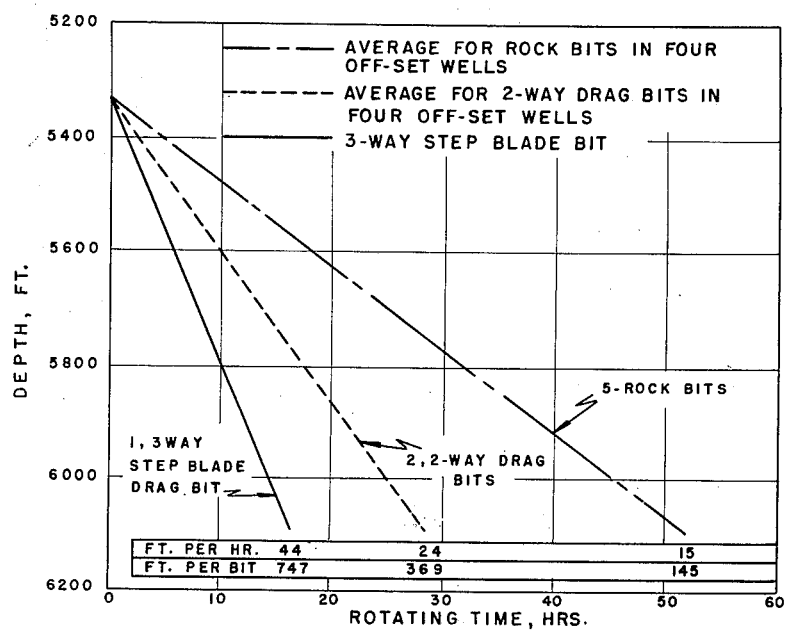
FIG. 10.
INVENTORS.
GEORGE E. CANNON,
CHARLES R. OVERLY,
BY THOMAS PENNINGTON, II,
JAMES E. ROOT, III,
ATTORNEY.

Oct. 23, 1962    G. E. CANNON ET AL    3,059,708
ABRASION RESISTANT STEPPED BLADE ROTARY DRILL BIT
Filed Aug. 7, 1959    4 Sheets-Sheet 3
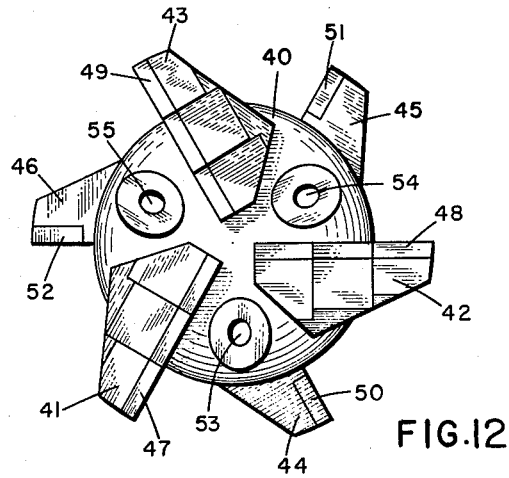
FIG.12
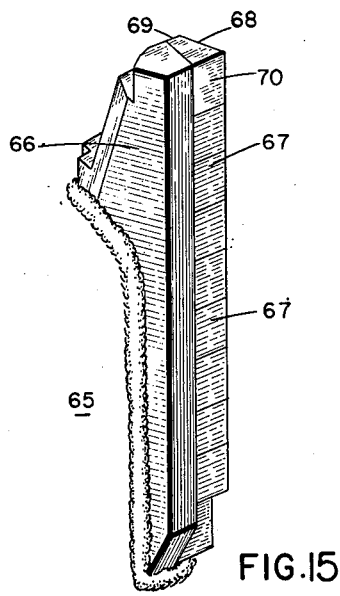
FIG.15
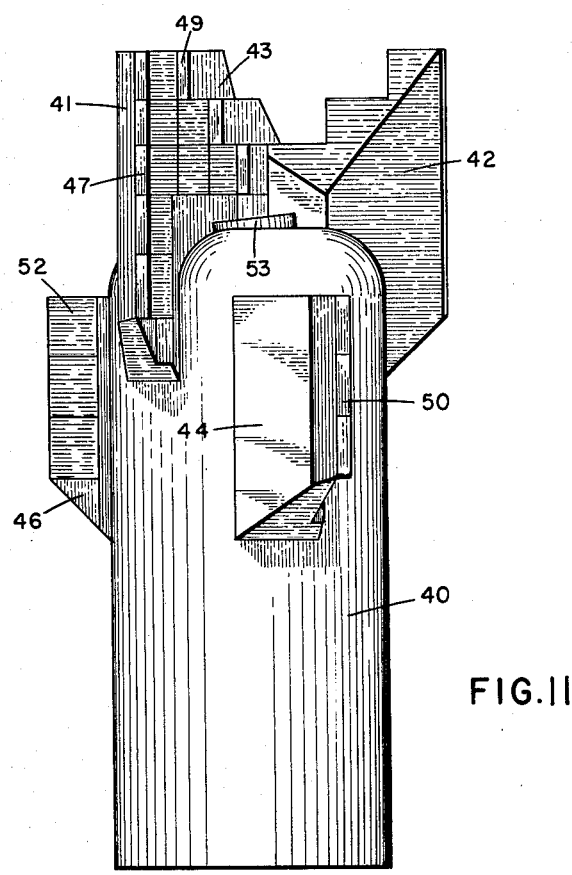
FIG.11
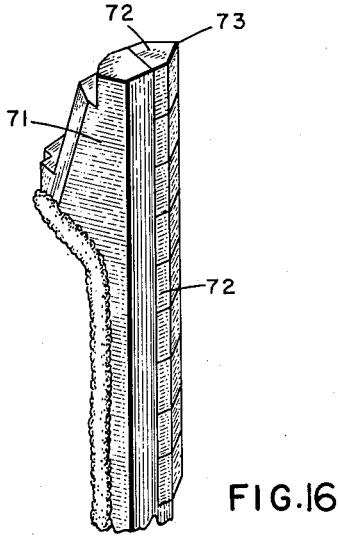
FIG.16
*INVENTORS.*
GEORGE E. CANNON,
CHARLES R. OVERLY,
BY THOMAS PENNINGTON, II,
JAMES E. ROOT, III,
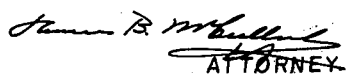
ATTORNEY

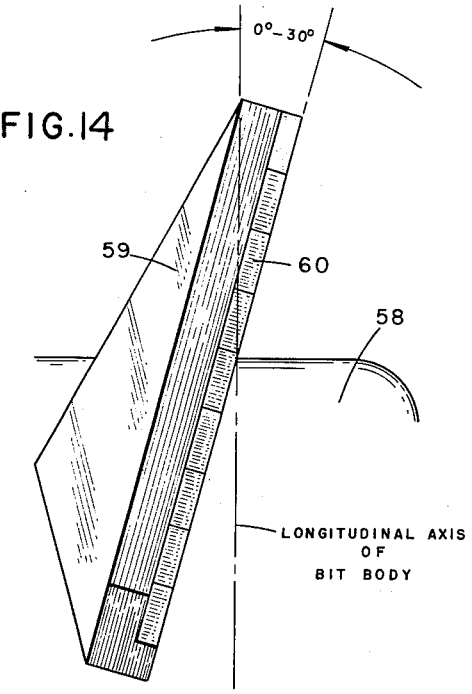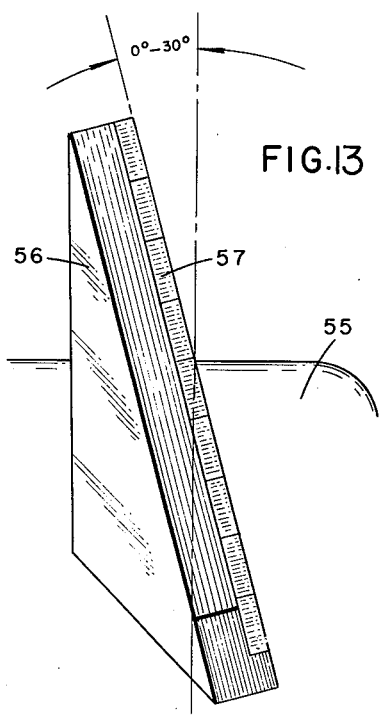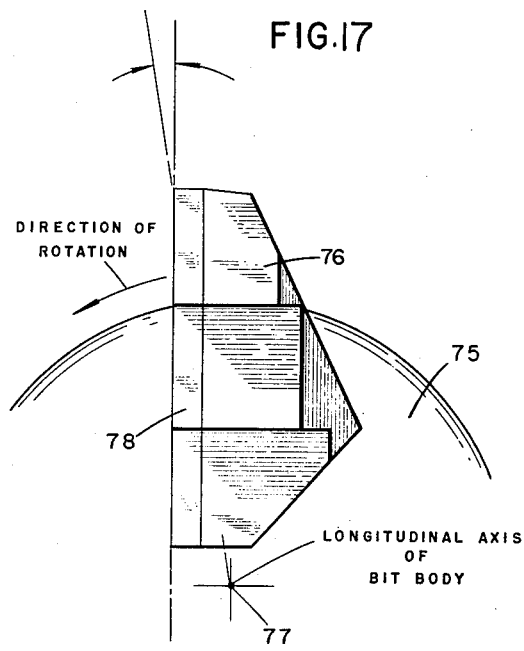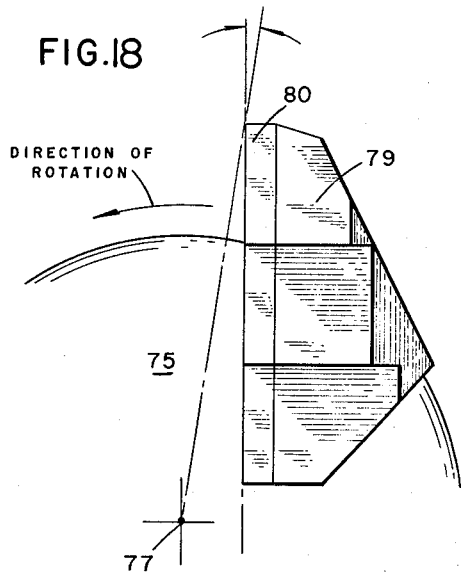

3,059,708
ABRASION RESISTANT STEPPED BLADE ROTARY
DRILL BIT
George E. Cannon and Charles R. Overly, Houston, James E. Root III, Bellaire, and Thomas Pennington II, New Braunfels, Tex., assignors, by mesne assignments, to Jersey Production Research Company, Tulsa, Okla., a corporation of Delaware
Filed Aug. 7, 1959, Ser. No. 832,359
17 Claims. (Cl. 175—393)

The present invention is directed to a drill bit. More particularly, the invention is concerned with a drill bit suitable for drilling through rock. In its more specific aspects, the invention is concerned with a rock drill bit which has a long life.

The present invention may be briefly described as a rock drill bit which comprises a body member on which at least one or a plurality of longitudinally extending, inwardly stepped blades are carried. The steps on the blades extend inwardly toward but terminate short of the longitudinal axis of the body member such that a core is formed on the bottom of a well drilled with the bit. At least one of the steps on the blades defines an angle with the longitudinal axis of the body member less than 90°. The leading face and edge of each of the blades are covered by an abrasion-resistant material, preferably in the form of plates. Nozzles, also constructed of abrasion-resistant material, lead the blades for discharging drilling fluid onto the bottom of the well, the nozzles being so directed to avoid impingement of drilling fluid on the leading face of the blades. The step blades and the impingement of drilling fluid fractures the core into large chips of rock for removal with the drilling fluid from the well.

The blades may be parallel to the longitudinal axis of the body member or the blades may be inclined at an angle relative to the longitudinal axis of the body member. Likewise, the blades may be radial or eccentrically extending relative to the axis of the body member.

The abrasion-resistant material, which is employed as plates, to cover the leading face and edge of the blades and to form the nozzles is preferably tungstem carbide, but other abrasion-resistant material such as cobalt borium, titanium carbide, tungsten carbide plates embedded with diamonds, and borium carbide may be used.

The number of blades on the drilling bit of the present invention may be one, two, three, or four, but ordinarily a drill bit will comprise three blade. The steps on the blades may be at least two in number and each blade may have an equal number of steps, for example, two or three steps. Preferably three blades are employed on the drill bit with three steps on each of the blades but the drill bit may have one blade with three steps and two blades with two steps.

The leading face and edge of the blades which are covered with the plates of abrasion-resistant material are preferably flat and thus present a cutting edge for drilling the well.

It may be desirable to increase the thickness of the abrasion-resistant material at the point or points of greatest wear and to this end it is desirable to have plates of greater thickness than ordinarily employed at or adjacent the end of the blade and on the leading edge. Suitably the plates of abrasion-resistant material may be thickened by tapering the plates outwardly toward the cutting edge.

The steps on the blades extend inwardly toward but terminate a distance from about 4% to about 30% of the diameter of a circle circumscribed by said blades short of the center of the circle, while the steps on the blades are each about 5% to about 30% of the diameter of the circle circumscribed by said blades.

The abrasion-resistant material, which has been exemplified before, covering the leading face and edge of the blades may be a sufficient thickness in the range from about 10% to about 60% of the blades' thickness such that the blades will have a long life and such that the ferrous metal alloy making up the blades will provide sufficient strength for the abrasion-resistant material.

Figure 3:
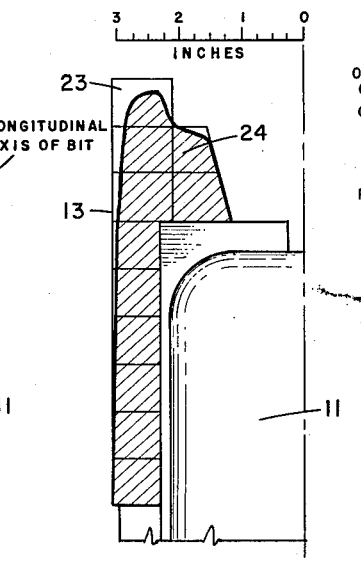
Figure 4:
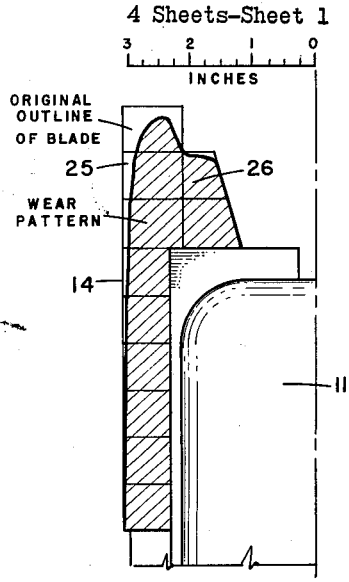
Figure 1:
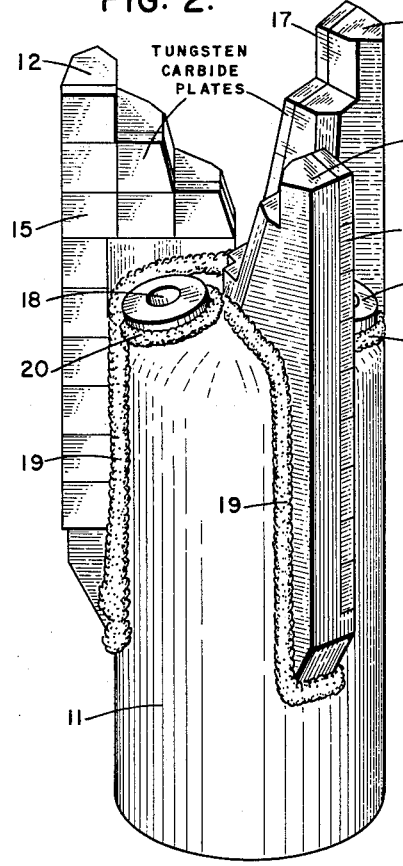
Figure 5:
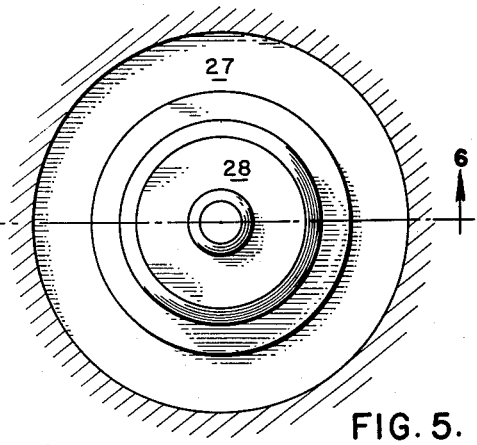
Figure 6:
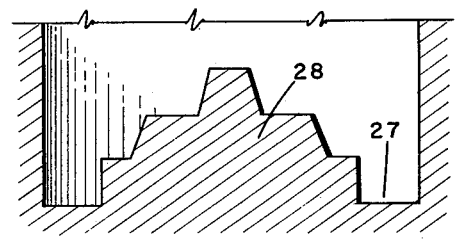

The present invention will be further illustrated by reference to the drawing in which:
FIG. 1 is an isometric view of a drill bit of the present invention;
FIG. 2 is a view showing the wear pattern of a blade with three steps of the drill bit of FIG. 1;
FIGS. 3 and 4 are similar views to that of FIG. 2 for the other blades of FIG. 1;
FIG. 5 is a view looking downwardly in a borehole showing the wear pattern in the bottom of a borehole;
FIG. 6 is a view taken along the lines 6—6 of FIG. 5;
FIG. 7 is a view in partial section of a blade of an improved drill bit showing the nozzle arrangement;
FIG. 8 is a view similar to FIG. 7 showing an extended nozzle;
FIG. 9 is another view of a blade of a drill bit with an extended nozzle;
FIG. 10 is a graph of data comparing the penetration in a well of the improved drill bit with the prior art device;
FIG. 11 is a view similar to FIG. 1 showing a modified form of a bit in which a reaming surface is provided;
FIG. 12 is a view looking downwardly on the bit of FIG. 11;
FIGS. 13 and 14 are further modifications of the bit of the present invention showing one blade thereof;
FIGS. 15 and 16 are partial views of a blade modified to increase the thickness of the abrasion-resistant material; and
FIGS. 17 and 18 are illustrations looking downwardly on a modification of a bit where the blades are provided a radial rake.

Referring now to the drawing and particularly to FIGS. 1 to 4, numeral 11 designates a body member of an improved drill bit which is internally threaded so that it may be connected into the lower end of a hollow drill string. Numerals 12, 13, and 14 designate blades attached to the body member 11. It is to be noted that the leading edge and face of the blades 12, 13 and 14 are covered by plates 15, 16, and 17 of abrasion-resistant material such as tungsten carbide. Leading each of the blades 12, 13, and 14 are nozzles 18, one of the nozzles 18 being hidden by the blade 14.

The blade 12 of the improved drill bit is provided with three steps with two of the steps being inclined at an angle less than 90° with the longitudinal axis of the body member 11 while blades 13 and 14 are provided with only two steps with one of the steps of each of the blades being at an angle less than 90°. A preferred range of the angles for the steps of the blades may be from about 0° to about 20° with the longitudinal axis of the body member. It is to be noted that the blades 12, 13 and 14 are secured to the body member 11 by welding and weld material 19. Likewise, the tungsten carbide nozzles 18 are secured in the body member 11 by welding and weld material 20.

Referring now to FIG. 2, which is a partial sectional view of the body member and the blade 12, the unshaded portion 21 shows the original outline of the blade 12 while the shaded portion 22 shows the wear of the blade 12 after drilling with the drill bit of FIG. 1. Likewise, the unshaded portion 23 shows the original outline of the blade 13 in FIG. 3 while the shaded portion 24 designates the pattern of the blade 13 after being employed in drilling.

Likewise, referring to FIG. 4, the outline 25, being an unshaded portion, shows the original configuration of the blade 14 whereas the shaded portion 26 shows the wear which has taken place on the blade 14 after employing it in drilling operations in a drill bit such as that of FIG. 1

It is to be noted, considering FIGS. 2 to 4, inclusive, that the wear took place substantially on the leading edge and the corners of the three blades of the drill bit shown in FIG. 1.

The wear pattern of the bottom of the hole resulting from drilling a well with a drill bit such as in FIG. 1 by rotating it in the earth's surface on the end of a hollow drill string is shown more clearly in FIGS. 5 and 6 wherein numeral 27 designates an annular groove which is cut by the blades 12, 13, and 14 and numeral 28 designates a stepped core which is formed by the bit in the drilling operations. This core conforms to the steps on the blades, which, as shown in the drawing, slope inwardly and upwardly toward the bit body member 11.

Referring to FIG. 7, a blade such as 12 provided with plates of tungsten carbide 15 is shown in partial section with a nozzle 18 of tungsten carbide communicating with the interior of the body 11 by a flow passage 27 to allow drilling fluid to impinge on the bottom of the well drilled with the drilling bit but so directed to avoid impinging against the leading edge and face of the blade 12. The impact of the fluid from the nozzle 18 assists fracturing the core 28 in drilling operations.

Referring now to FIG. 8, which is a blade similar to that shown in FIG. 1, numeral 28 designates a blade whose leading face and edge are covered with plates 29 of tungsten carbide and having an extended nozzle 30 communicating fluidly with the interior of the body member 11. By providing an extended nozzle such as 30 close to the bottom of the well contacted by the blade 28, the impact of the fluid further assists in destroying the core 28.

In FIG. 9, a blade 31 similar to that shown in FIGS. 3 and 4 is covered with plates 32 of abrasion-resistant material such as tungsten carbide, is provided with an extended nozzle 33 which communicates with the interior of the body 11 by welding the tubular nozzle 33 into the body member 11.

In the showings of FIGS. 7 to 9, inclusive, FIG. 7 shows a nozzle which is adaptable to be used on a bit with any combination of blades while FIG. 8 is adapted to be used on bits having a combination of blades but particularly with a bit having three blades of the type of blade 12 of FIG. 1. The bit of FIG. 9, with the extended nozzle, is adapted to be used with any combination of blades such as in FIG. 1 or with blades having or being of the same configuration or with blades of different configuration.

Referring now to FIG. 10, the depth of a well is plotted against rotating time in hours in drilling a well. The immediate left hand curve shows the drilling rate for a drill bit in accordance with the present invention and shows that 747 feet were penetrated with the drill bit at a rate of 44 feet per hour while the next curve proceeding to the right shows the drilling rate for two 2-way conventional drag bits at only 24 feet per hour with a footage per bit of 369 feet. This curve on the right shows the drilling rate for five rock bits and the drilling rate was only 15 feet per hour with 145 feet drilled per bit. In other words, the present invention is over 100% better in drilling footage than the conventional two-way drag bit and over 500% better in drilling footage than the rock bit. The drilling rate for the improved bit is also substantially better than the drag bits.

Referring now to FIGS. 11 and 12, numeral 40 designates an elongated bit body provided with a plurality of elongated blades 41, 42, and 43 and also provided with wings 44, 45, and 46 arranged thereon. The wings 44, 45, and 46 are spaced circumferentially and vertically from the blades 41, 42, and 43 and are carried laterally by the body 40. In the bit of FIGS. 11 and 12, the drill bit of FIG. 1 is modified such that the length of the blades on the bit body is shortened and the corresponding length thereof is provided on the wings 44, 45, and 46. The blades 41, 42, and 43 are provided, respectively, with plates of abrasion-resistant material 47, 48, and 49 while the wings 44, 45, and 46 are likewise provided with plates 50, 51, and 52 of abrasion-resistant material. The drill bit of FIGS. 11 and 12 is also provided with nozzles 53, 54, and 55, also suitably constructed of abrasion-resistant material to discharge drilling fluid ahead of the leading faces of the several blades.

In drilling with a rock cutting drilling bit, as illustrated in FIG. 1, ordinarily the hole size is from about 10 to about 15 percent greater than the diameter of the bit. This enables reduction of the reaming gauge concentration by reducing the length of the blades and providing an equal amount of reaming surface by staggered arrangement on the bit body, as shown in FIGS. 11 and 12.

Advantages of the device of FIGS. 11 and 12 over that of FIG. 1 include a less tendency of the drill bit to heel and the minimizing of the point of contact of the reaming surface on the downside of a deviated hole which will contribute to drilling and maintaining the hole in a vertical effect. This point contact (minimum gauge reaming area) on the bottom side of a well bore that has deviated from the vertical takes advantage of the pendulum effect of the drill string below a stabilizer located above the drill bit, applying a load to the reaming edge of the bit and causing reorientation of the bit in a vertical direction. The device of FIGS. 11 and 12 is therefore quite useful and advantageous.

Referring now to FIGS. 13 and 14, a drill bit provided with a body 55 has an elongated blade 56 provided with plates 57 of abrasion-resistant material. It is noted that the blade 56 is at an angle from the longitudinal axis of the body 55 which may be in the range from about 0° to about 30°. While only one blade is shown in FIG. 13, it will be understood that a plurality of blades may be provided and that the body member will also be provided with abrasion-resistant nozzles for discharging drilling fluid ahead of the leading face and edge of the blade such as 56.

In the embodiment of FIG. 14, a body member 58 is provided with a blade 59 having plates 60 of abrasion-resistant material on the leading face and edge of the blade 59. Like the drill bit of FIG. 13, a plurality of blades 59 may be provided and it will be understood that the drill bit of FIG. 14 is also provided with abrasion-resistant nozzles for discharge of drilling fluid ahead of the leading face and edge of the blade 59.

In FIGS. 13 and 14, it will be noted that in FIG. 13 a negative rake is provided while in FIG. 14 a positive rake is provided.

Likewise, in FIGS. 13 and 14, the blades 56 and 59 will be suitably stepped, as shown in the other embodiments.

Since tungsten carbide, which is the preferred abrasion-resistant material, has superior compressive strength properties, the embodiments of FIGS. 13 and 14 take advantage of these characteristics in addition to increasing cutting efficiency by causing the rock to fail. A negative or positive rake, that is, the angle between the blade and the longitudinal axis of the bit body of about 0° to about 30°, is applied to the blades in locating them such that the resulting force of the weight on the bit and the force applied through rotation of the bit is designed to increase the rock failing efficiency and enhance the ability of the abrasion-resistant material to withstand the loads imposed by the rotary drilling operation. The embodiments of FIGS. 13 and 14 are therefore also quite advantageous and useful.

As shown in FIGS. 2 to 4 of the drawing, the wear of the abrasion-resistant material on bit blades is predominately concentrated in the reaming or outside edge of the drill bit blades. This increased wear may be minimized or suppressed by increasing the thickness of the abrasion-resistant material at the proper point, as shown in FIGS. 15 and 16. In FIG. 15, a body member 65 is provided with a blade 66 having abrasion-resistant plates 67 thereon which taper to a greater thickness outwardly, the tapered surface 68 having a minimum thickness 69 on the inside and a maximum thickness 70 on the outside.

In FIG. 16 a blade 71 is provided with double tapered abrasion-resistant material 72 such that a pointed tip 73 on the cutting element is provided. This pointed tip causes increased concentration of force on the rock, which reduces the force necessary to cause the rock to fail.

In the modification of FIGS. 15 and 16, the shearing force in the radial direction is asserted on the rock, causing increased drilling and cutting efficiency.

It will be understood that the modifications of FIGS. 15 and 16 are suitably provided with a plurality of blades and a plurality of abrasion-resistant nozzles for discharge of drilling fluid ahead of the leading faces and edges of the blades.

In FIGS. 15 and 16, the blades 66 and 71 have two steps, but a lesser or greater number of steps may be used.

Referring now to FIGS. 17 and 18 embodiments are provided in which a body member 75, referring to FIG. 18, has a blade 76 arranged thereon eccentric to or spaced to the left from the vertical axis 77 of the body member 75. The blade 76 is provided with plates 78 of abrasion-resistant material.

In FIG. 18 the blade 79 on the body member 75 is eccentric to or spaced to the right of the longitudinal axis 77 of the body member 75. Like the embodiment of FIG. 18, the blade 79 has plates 80 of abrasion-resistant material.

In the embodiments of FIGS. 17 and 18, an eccentric radial rake ranging from about 0° to about 20° is imparted to the bit blades by locating them either to the left or to the right of the longitudinal axis of the body member, which causes a shearing action on the rock to increase the cutting efficiency of the bit and provides a more advantageous stress distribution in the abrasion-resistant material, enhancing its ability to withstand the loads imposed on the drill bit by the rotary drilling method. In short, in the embodiments of FIGS. 17 and 18, the leading faces and edges approach the rock eccentrically as shown in these two embodiments rather than radially as in the other embodiments.

It will be understood that the modifications of FIGS. 17 and 18 may comprise a plurality of stepped blades with abrasion-resistant material and further provided with abrasion-resistant nozzles, as shown in the several other figures of the drawing. As shown in all figures of the drawing, the steps of each of the blades are arranged linearly.

The present invention is quite important and useful in that a definite need exists for efficient and long life small-diameter drill bits to drill wells compatible in size to recent developments in tubingless completion techniques wherein miniaturization of regular equipment and other means have been employed to reduce fixed and daily drilling costs. Provision of a drill bit in accordance with the present invention will make such miniaturization a relatively easy task since in conventional rolling cone rock bits, the limited space available in drilling of such small diameter holes precludes the provision of suitable bearings. Therefore, a bearingless type bit in accordance with the present invention has been provided which allows a long life during drilling operations.

Thus, in the present invention, an improved drill bit having two or more blades attached to the bit body is provided. The blades are so formed that the outer portion contacts the earth formations at a relatively large area as compared with the total area of the bottom of the well bore which is being cut. As a result, more severe wear is experienced on this portion of the blade. The blades of extended length are provided to compensate for more severe wear and the blades are stepped vertically to terminate short of the longitudinal axis of the body member. As an example, the outer step of 6¼" bit such as shown in FIG. 1 constitutes about 30% of the hole diameter whereas the blade contacts approximately 50% of the formation being cut.

The extended blade at the outside bores of the hole takes advantage of the high stress concentration existing in the earth formation in this portion of the hole, which enhances the ability of the improved drill bit to cut or abrade an annular groove in the bottom of the well bore in such a manner that a core is formed in the center of the hole which is efficiently fractured or abraded by the interblade steps. By providing a device in accordance with the present invention, the drilling operation is caused by both abrading and fracturing of the rock as the bit is rotated in the well on the end of a hollow drill string wherein the outer steps on the blades abrade an annular groove while upstanding cores of rock formation remain to be fractured by downward and rotational force of the steps of the bit blades. The force vector applied to the formation is at an angle downwardly and inwardly from the base of each of the grooves being cut by the steps on the blades to fracture cuttings or segments of the core in the form of large chips. Vibration, rotation, and the impact of fluid all assist in causing failure or fracturing of the cone. Thus, approximately 50% of the bottom of the earth formation is cut or abraded and the remaining 50% of the rock formation is fractured from its position in the bottom of the well bore which increases the speed and efficiency of the drill bit of the present invention. In the drill bit of the present invention, the amount of bit to the metal in contact with the rock phase is reduced to impose a greater stress concentration on the rock for a given bit weight than imposed by conventional bits. By reducing the number of step cutters on the inner portions of the bit and by fracturing the interior core by radial force alone, improved operations result. In addition, a self-sharpening action is effected by providing on the leading edge and face of each of the blades plates of tungsten carbide or other suitable abrasion-resistant material which are exposed as the softer steel wears away. The alloy steel blades support the tungsten carbide plates.

Thus the present invention allows drilling to proceed with improved bit life and allows drilling to proceed at a greater rate than heretofore.

The present invention is therefore of great advantage and utility and has been used in rotary drilling of wells. Thus in a field in southwest Texas a 7⅞" bit in accordance with the present invention drilled at about double the rate and life of conventional drill bits and at about three times the rate of cone rock bits with a fivefold increase in bit life.

In a field in California a 6¼" bit in accordance with the present invention was about ⅓ dull after drilling 3350 feet to a depth of 3887 feet at an average penetration of 158 feet per hour. A comparable interval drilled in an offset well required seven 6¼" conventional rock bits. Considering rotating and trip time, the improved bit of the present invention drilled the interval in about ⅓ the time required with 6¼" rock bits on the offset well. Based on previous well experience drilled with 6¼" rock bits, 7 of the improved bits equaled the performance of 25 rock bits.

The nature and objects of the present invention having been completely described and illustrated, what we wish to claim as new and useful and secure by Letters Patent is:

1. A rock drill bit which comprises a body member, a plurality of longitudinally extending, inwardly and upwardly stepped blades carried by said body member, the steps on one of said blades being three in number and the steps on each of said blades extending inwardly toward but terminating short of the longitudinal axis of said body member whereby a core is formed on the bottom of a well drilled with said bit, at least one of the steps on the blades sloping inwardly and upwardly towards the body member and defining an angle with the longitudinal axis of said body member less than 90°, said steps on each of said blades being arranged linearly and terminating a distance from about 4% to about 30% of the diameter of a circle circumscribed by said blades short of the center of said circle, the leading face and edge of each of said blades being covered by abrasion-resistant material, and nozzles on said body member spaced away from and leading said blades for discharging drilling fluid from the interior of said body member onto the bottom of the well, said nozzles being arranged on said body member to discharge drilling fluid in a direction to avoid impingement of said drilling fluid on said leading face, said stepped blades fracturing said core into large chips of rock for removal with said drilling fluid from the well.

2. A drill bit in accordance with claim 1 in which the abrasion-resistant material is tungsten carbide.

3. A drill bit in accordance with claim 1 in which the leading edge and face of said blade are covered by plates of said abrasion-resistant material.

4. A rock drill bit in accordance with claim 1 in which the blades are parallel to the longitudinal axis of the body member.

5. A rock drill bit in accordance with claim 1 in which the blades are inclined at angle relative to the longitudinal axis of the body member.

6. A rock drill bit in accordance with claim 1 in which the blades extend radially from the radial axis of the body member.

7. A rock drill bit in accordance with claim 1 in which the blades extend eccentrically from the radial axis of the body member.

8. A rock drill bit in accordance with claim 7 in which the abrasion-resistant material is tungsten carbide.

9. A rock drill bit which comprises a body member, a plurality of longitudinally extending, inwardly and upwardly stepped blades carried by said body member, the steps on each of said blades being three in number and extending inwardly toward but terminating short of the longitudinal axis of said body member whereby a core is formed on the bottom of a well drilled with said bit, at least one of the steps on the blades sloping inwardly and upwardly towards the body member and defining an angle with the longitudinal axis of said body member less than 90°, said steps on each of said blades being arranged linearly and terminating a distance from about 4% to about 30% of the diameter of a circle circumscribed by said blades short of the center of said circle, the leading face and edge of each of said blades being flat and covered by abrasion-resistant material, and nozzles on said body member spaced away from and leading said blades for discharging drilling fluid from the interior of said body member onto the bottom of the well, said nozzles being arranged on said body member to discharge drilling fluid in a direction to avoid impingement of said drilling fluid on said leading face, said stepped blades fracturing said core into large chips of rock for removal with said drilling fluid from the well.

10. A rock drill bit which comprises a body member, a plurality of longitudinally extending, inwardly and upwardly stepped blades carried by said body member, the steps on one of said blades being three in number and the steps on each of said blades extending inwardly toward but terminating short of the longitudinal axis of said body member whereby a core is formed on the bottom of a well drilled with said bit, at least one of the steps on the blades sloping inwardly and upwardly towards the body member and defining an angle with the longitudinal axis of said body member less than 90°, said steps on each of said blades being arranged linearly and terminating a distance from about 4% to about 30% of the diameter of a circle circumscribed by said blades short of the center of said circle, the leading face and edge of each of said blades being flat and covered by plates of abrasion-resistant material, and nozzles on said body member spaced away from and leading said blades for discharging drilling fluid from the interior of said body member onto the bottom of the well, said nozzles being arranged on said body member to discharge drilling fluid in a direction to avoid impingement of said drilling fluid on said leading face, said stepped blades fracturing said core into large chips of rock for removal with said drilling fluid from the well.

11. A rock drill bit in accordance with claim 10 in which the blades are three in number and each blade has an equal number of steps.

12. A rock drill bit in accordance with claim 10 in which the blades are three in number and two of the blades have two steps.

13. A rock drill bit which comprises a body member, a plurality of longitudinally extending, inwardly and upwardly stepped blades carried by said body member, the steps on one of said blades being three in number and the steps on said blades each being about 5% to about 30% of the diameter of a circle circumscribed by said blades and extending inwardly toward but terminating short of the center of said circle whereby a core is formed on the bottom of a well drilled with said bit, at least one of the steps on the blades sloping inwardly and upwardly towards the body member and defining an angle with the longitudinal axis of said body member less than 90°, said steps on each of said blades being arranged linearly and terminating a distance from about 4% to about 30% of the diameter of a circle circumscribed by said blades short of the center of said circle, the leading face and edge of each of said blades being covered by abrasion-resistant material, and abrasion-resistant nozzles on said body member spaced away from and leading said blades for discharging drilling fluid from the interior of said body member onto the bottom of the well, said nozzles being arranged on said body member to discharge drilling fluid in a direction to avoid impingement of said drilling fluid on said leading face, said stepped blades fracturing said core into large chips of rock for removal with said drilling fluid from the well.

14. A rock drill bit which comprises a body member, a plurality of longitudinally extending, inwardly and upwardly stepped blades carried by said body member, the steps on one of said blades being three in number and the steps on each of said blades extending inwardly toward but terminating short of the longitudinal axis of said body member whereby a core is formed on the bottom of a well drilled with said bit, at least one of the steps on the blades sloping inwardly and upwardly towards the body member and defining an angle with the longitudinal axis of said body member less than 90°, said steps on each of said blades being arranged linearly and terminating a distance from about 4% to about 30% of the diameter of a circle circumscribed by said blades short of the center of said circle, the leading face and edge of each of said blades being covered by a sufficient thickness in the range from about 10% to about 60% of the blade's thickness of abrasion-resistant material, and abrasion-resistant nozzles on said body member spaced away from and leading said blades for discharging drilling fluid from the interior of said body member onto the bottom of the well, said nozzles being arranged on said body member to discharge drilling fluid in a direction to avoid impingement of said drilling fluid on said leading face, said stepped blades fracturing said core into large chips of rock for removal with said drilling fluid from the well.

15. A rock drill bit which comprises a body member, a plurality of longitudinally extending, inwardly and upwardly stepped blades carried by said body member, the steps on one of said blades being three in number and the steps on each of said blades extending inwardly toward but terminating short of the longitudinal axis of said body member whereby a core is formed on the bottom of a well drilled with said bit, at least one of the steps on the blades sloping inwardly and upwardly towards the body member and defining an angle with the longitudinal axis of said body member less than 90°, said steps on each of said blades being arranged linearly and terminating a distance from about 4% to about 30% of the diameter of a circle circumscribed by said blades short of the center of said circle, a plurality of wings carried laterally by said body member spaced circumferentially between and vertically from said blades, the leading face and edge of each of said blades and wings being covered by abrasion-resistant material, and nozzles on said body member spaced away from and leading said blades for discharging drilling fluid from the interior of said body member onto the bottom of the well, said nozzles being arranged on said body member to discharge drilling fluid in a direction to avoid impingement of said drilling fluid on said leading face, said stepped blades fracturing said core into large chips of rock for removal with said drilling fluid from the well.

16. A rock drill bit which comprises a body member, a plurality of longitudinally extending, three inwardly and upwardly stepped blades carried by said body member, the steps on said blades being three in number and extending inwardly toward but terminating short of the longitudinal axis of said body member whereby a core is formed on the bottom of a well drilled with said bit, at least one of the steps on the blades sloping inwardly and upwardly towards the body member and defining an angle with the longitudinal axis of said body member less than 90°, said steps on each of said blades being arranged linearly and terminating a distance from about 4% to about 30% of the diameter of a circle circumscribed by said blades short of the center of said circle, the leading face and edge of each of said blades being covered by abrasion-resistant material, said abrasion-resistant material being formed to taper outwardly from the center of said body member such that a greater thickness is provided on the outer edge than on the inner edge, and nozzles on said body member spaced away from and leading said blades for discharging drilling fluid from the interior of said body member onto the bottom of the well, said nozzles being arranged on said body member to discharge drilling fluid in a direction to avoid impingement of said drilling fluid on said leading face, said stepped blades fracturing said core into large chips of rock for removal with said drilling fluid from the well.

17. A rock drill bit which comprises a body member, three longitudinally extending, inwardly and upwardly stepped blades carried by said body member, the steps on said blades being three in number and the steps on each of said blades extending inwardly toward but terminating short of the longitudinal axis of said body member whereby a core is formed on the bottom of a well drilled with said bit, at least one of the steps on the blades sloping inwardly and upwardly towards the body member and defining an angle with the longitudinal axis of said body member less than 90°, said steps on each of said blades being arranged linearly and terminating a distance from about 4% to about 30% of the diameter of a circle circumscribed by said blades short of the center of said circle, the leading face and edge of each of said blades being covered by abrasion-resistant material, said abrasion-resistant material being formed to provide a pointed tip on the leading face of each of said blades, and nozzles on said body member spaced away from and leading said blades for discharging drilling fluid from the interior of said body member onto the bottom of the well, said nozzles being arranged on said body member to discharge drilling fluid in a direction to avoid impingement of said drilling fluid on said leading face, said stepped blades fracturing said core into large chips of rock for removal with said drilling fluid from the well.

References Cited in the file of this patent
UNITED STATES PATENTS

| | | |
|---|---|---|
| 1,733,241 | Scott | Oct. 29, 1929 |
| 1,859,660 | Erlandson | May 24, 1932 |
| 1,873,240 | Wright | Aug. 23, 1932 |
| 1,899,771 | Reed | Feb. 28, 1933 |
| 1,923,488 | Howard et al. | Aug. 22, 1933 |
| 1,961,390 | Ragsdale | June 5, 1934 |
| 2,090,058 | Mangels | Aug. 17, 1937 |
| 2,199,692 | Catland | May 7, 1940 |
| 2,634,953 | Stokes | Apr. 14, 1953 |
| 2,695,158 | Hawthorne et al. | Nov. 23, 1954 |
| 2,735,656 | Hoglund et al. | Feb. 21, 1956 |
| 2,740,611 | Bowen | Apr. 3, 1956 |
| 2,740,612 | Phipps | Apr. 3, 1956 |
| 2,830,794 | Mills | Apr. 15, 1958 |
| 2,855,181 | Olsen | Oct. 7, 1958 |
| 2,855,994 | Kammerer | Oct. 14, 1958 |
| 2,894,726 | Weaver et al. | July 14, 1959 |